United States Patent [19]

Mori

[11] 4,425,905
[45] Jan. 17, 1984

[54] SUNLIGHT COLLECTING AND CONCENTRATING APPARATUS

[76] Inventor: Kei Mori, 3-16-3-501, Kaminoge, Setagaya-ku, Tokyo, Japan

[21] Appl. No.: 398,635

[22] Filed: Jul. 15, 1982

[30] Foreign Application Priority Data

Jul. 18, 1981 [JP] Japan ............................... 56-112510

[51] Int. Cl.³ ............................................... F24J 3/02
[52] U.S. Cl. ..................... 126/425; 126/439; 350/96.10; 350/96.24
[58] Field of Search ............... 126/424, 425, 438, 439, 126/451; 350/96.10, 96.24, 289, 293, 294, 96.15; 353/3

[56] References Cited

U.S. PATENT DOCUMENTS

| | | | |
|---|---|---|---|
| 4,026,267 | 5/1977 | Coleman | 350/96.24 X |
| 4,201,197 | 5/1980 | Dismer | 126/451 |
| 4,297,000 | 10/1981 | Fries | 350/96.24 X |
| 4,307,936 | 12/1981 | Ochiai | 350/96.24 |

Primary Examiner—Samuel Scott
Assistant Examiner—Margaret A. Focarino
Attorney, Agent, or Firm—Merchant, Gould, Smith, Edell, Welter & Schmidt

[57] ABSTRACT

A sunlight collecting and concentrating apparatus having a mirror or lens device rotated independently about a vertical and horizontal axis, respectively, so that the mirror or lens always faces the sun when despite change is in the sun's azimuth and altitude. An optical conductor is provided which has a first section arranged coaxially with the horizontal axis and a second section arranged coaxially with the vertical axis. Means are provided between the first and second conductors for allowing relative rotation therebetween. Thus, no winding torsion of the conductors take place during the rotational movement of the mirror about the first and the second axes. Means are also provided for preventing winding or torsion of cable for transmission of signals from the tracking sensor device to a control circuit for operating the mirror.

16 Claims, 6 Drawing Figures

SUNLIGHT COLLECTING AND CONCENTRATING APPARATUS

BACKGROUND OF THE INVENTION

The present invention relates to a sunlight collecting and concentrating apparatus provided with a mirror or lens means, a tracking means for moving the mirror or lens means to follow daily and hourly changes in the sun's azimuth and altitude, and optical conductor for transmission of the collected sunlight to the region where the sunlight is required.

In recent years, a need has arisen to save energy. Many attempts have been made to provide systems making effective use of the solar light energy reaching the earth's surface. Conventional systems are provided with a mirror or lens means operated to follow the daily and hourly changes in the sun's azimuth and altitude so as to always face the sun and collect solar light energy most effectively. For most effective use, the solar light energy must be directly used in the form of light without conversion to other forms of energy, such as electric or thermal energy.

In view of the above, the present inventor has already developed a sunlight collecting and concentrating apparatus comprising a collector, operable to follow the change in the sun's azimuth and altitude and capable of condensing the collected sunlight, and an optical fiber or other optical conductor for receiving the condensed light. The condensed light is transmitted via the optical fiber to the region where the light is required. Thus, effective collection is attained irrespective of the daily and hourly change in the sun's azimuth and altitude and without any loss due to energy conversion.

In this type of apparatus of the present inventor, the collector is advantageously comprised of a mirror or lens means having two perpendicular axes of rotation one horizontal and the other vertical, independent rotational motion capable by each axis, thus enabling the mirror or lens means to follow the changes in the sun's azimuth and altitude. Thus, the optical conductor connected to the collector and the cables connecting the tracking means with an outside controller tend to become wound up or subject to torsion. This winding or torsion of the optical conductor for the cables adversely affects the tracking operation.

SUMMARY OF THE INVENTION

Thus, an object of the present invention is to provide a sunlight collecting and concentrating apparatus, of the type developed by the present inventor, capable of preventing winding or torsion of the optical fiber of cable when the mirror or lens means is rotated along the axis to keep the means continually facing the sun.

BRIEF DESCRIPTION OF THE DRAWINGS

The present invention will be fully understood from the following description together with the accompanying drawings, in which.

DETAILED DESCRIPTION OF THE PREFERRED EMBODIMENTS

Figure 1:
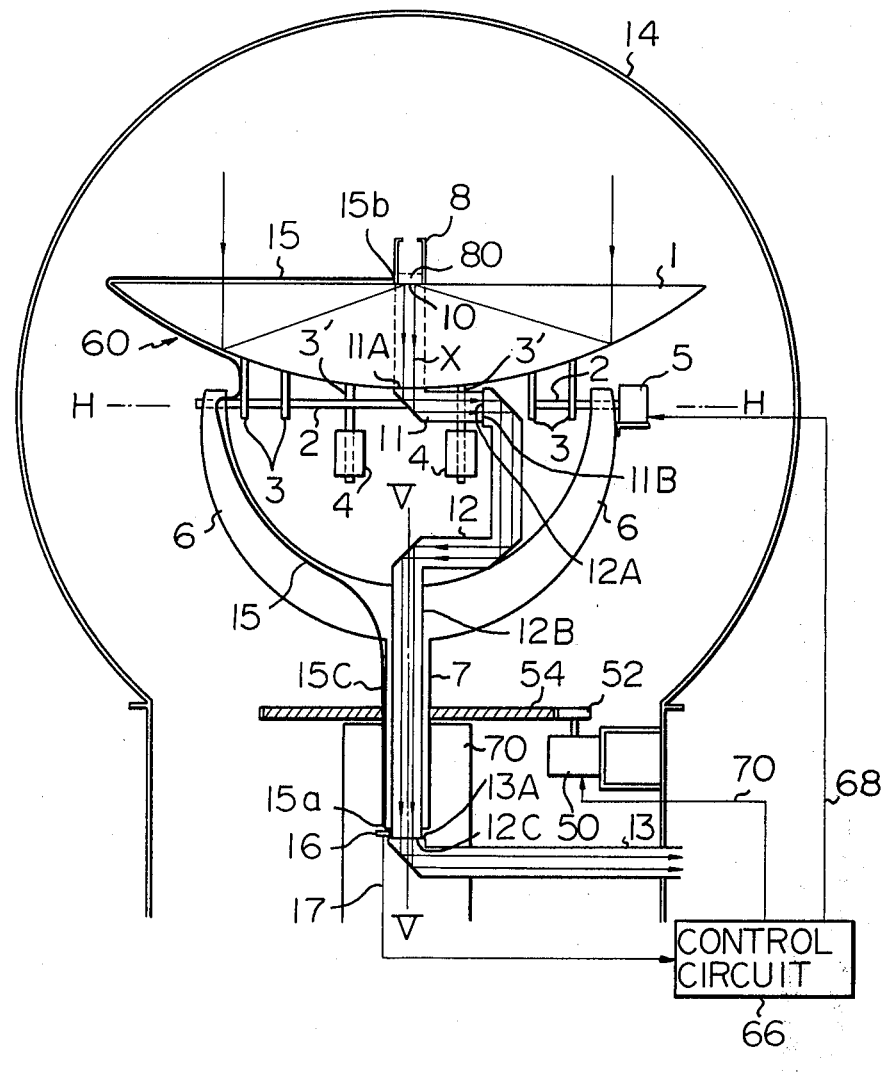
FIG. 1 is a schematic vertical side view of a mirror type apparatus according to one embodiment of the present invention.

In FIG. 1, showing an embodiment of the present invention, there is transparent housing 14 enclosing parabolic mirror 1. At the rear of parabolic mirror 1 are arms 3 and 3'. Arms 3' have balance weights 4 connected to them. Arms 3 are fixedly connected on ends remote from parabolic mirror 1, to pins 2 having an axis of rotation H—H which extends horizontally. Pins 2 are rotatably connected on the ends thereof to support arms 6. Support arms 6 extend integrally from shaft 7 having an axis of rotation V—V which extends vertically. Shaft 7 is rotatably connected to a base column 70. Electric motor 5 is mounted to one of arms 6 to rotate the corresponding pin 2 so as to turn parabolic mirror 1 about first axis H—H. Another electric motor 50 is also connected to second shaft 7 via gears 52 and 54 to rotate shaft 7. Thus parabolic mirror 1 rotates about second axis V—V.

Reference numeral 8 denotes tracking sensor device for providing signals indicating the sun's azimuth and altitude. Sensor device 8 operates, as well known, to provide signals indicating whether or not parabolic mirror 1 faces the sun. Sensor device 8 may have the construction proposed by the present inventor in Japanese Patent Application No. 56-69781. The signals are transmitted via transmission system 60 including, as will be fully described later, optical conductor 15 and electric lines 17, and introduced into an outside control circuit 66. Control circuit 66 is connected to motor 5 and 50 via electric lines 68 and 70, respectively. When sensor device 8 detects that the parabolic mirror 1 is not facing the sun, control circuit 66 operates to provide signals directed to motors 5 and 50 via electric lines 68 and 70, respectively. This initiates rotational motion of the mirror about horizontal axis H—H and/or vertical axis V—V, respectively, independent with each other, to bring parabolic mirror 1 to face the sun. Thus, the parabolic mirror 1 can follow the daily and hourly changes in the sun's azimuth and altitude, so that the sunlight received by parabolic mirror 1 can always be condensed to the mirror focal point.

At the focal point of parabolic mirror 1, there is arranged second parabolic mirror 10 for generating a substantially parallel condensed beam X. Beam X is transmitted to the region where the light is desired via an optical conductor system, as will be fully described hereinbelow. Such an optical conductor system comprises, according to the embodiment shown in FIG. 1, first, second, and third sections 11, 12, and 13, each being made of optical conductor tubes or rods. First optical conductor rod 11 is arranged concentrically with respect to horizontal axis H—H. First optical conductor rod 11 is provided with first end 11A opened so as to receive condensed beam X from second parabolic mirror 10 and with second end 11B rotatably connected to one end 12A of second optical conductor rod 12. Second optical conductor rod 12 has portion 12B passed concentrically through shaft 7. Second optical conductor rod 12 at second end 12C rotatably connected to one end 13A of third optical conductor rod 13, which is fixedly connected to column 70. The other end (not shown) of third optical conductor rod 13 is connected to the region where the collected sunlight is desired. It should be noted that, instead of connection to third, optical conductor rod 13, second optical conductor rod 12 may extend downward through shaft 70 so that the not shown end of the rod 12 terminates at the region where the collected sunlight is to be used.

When parabolic mirror 1 is rotated about axis H—H or V—V during the tracking operation, relative rotation is allowed between the first and second optical conductor rods 11 and 12 or between second and third optical conductor rods 12 and 13. This enables transmission of light from parabolic mirror 1 to the region where the light is desired without winding or torsion of optical conductor rods 11, 12, and 13.

Figure 2:
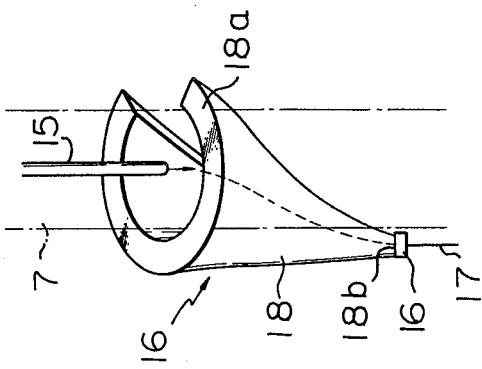
FIG. 2 is a schematic perspective view of an optical coupling for transmission of signals from sun tracking sensors to a control circuit.

As will be clear from the above, the present invention enables transmission of the collected sunlight to the desired place without winding or torsion of the optical conductor during tracking motion of parabolic mirror 1. In addition, the present invention also prevents winding or torsion otherwise generated in electric line 60 for connecting sensor device 8 with control circuit 66. As shown in FIG. 1, transmission system 60 for connecting sensor device 8 with control circuit 66 includes luminescent semiconductor diodes 80 to convert electric signals from sensor device 8 into photo signals. It further includes optical conductor 15 connected on one end 15b to diodes 80. Optical conductor 15 has portion 15C arranged along shaft 7. Optical conductor 15 is open at second end 15a to a photoelectric transducer 16 stationarily mounted on column 70. Photoelectric transducer 16 comprises, as shown in FIG. 2, a plurality of circumferentially arranged photocells 16a each connected to control circuit 66 via electric lines 17. Thus, photo signals from optical conductor 15 are received by one of photocells 16a even if shaft 7 is rotated during the tracking operation of parabolic mirror 1.

If the signal from the diode 80 connected to the sensor 8 is directly introduced to the controller to operate the motors, a high accuracy cannot be obtained due to the low sensitivity of the photocells 16 and the disturbance (noise). Thus, the diode 80 may be advantageously on-off controlled to provide digital photo signals introduced into the cable 15.

Figure 3:
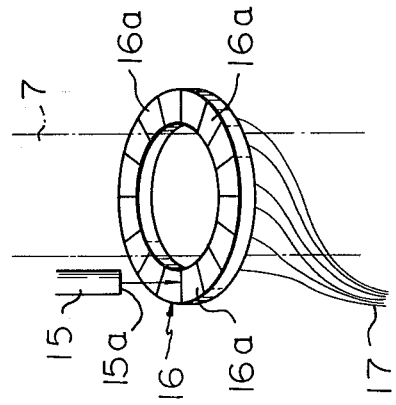
FIG. 3 is a schematic perspective view of another modification of an optical coupling.

In another modification, photoelectric transducer 16 may comprise, as shown in FIG. 3, ring-shaped optical conductor 18 having widened inlet end 18a and second converged end 18b. Optical conductor 15 is open to inlet end 18a of optical conductor 18. Photocell 16 is arranged to face end 18b of optical conductor 15. Photocell 16 is connected via a single electric line 17 to control circuit 66 in FIG. 1. Photosignal from the cable 15 connected to sensor device 8 may also be received by photocell 16 at all times irrespective of the angular position of optical conductor 15 with respect to optical conductor 18.

Figure 4:
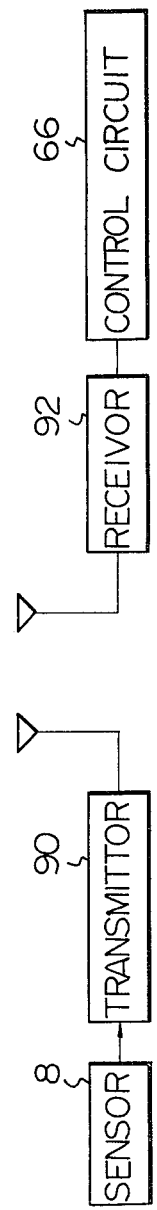
FIG. 4 shows a diagram of a radio transmission system for transmitting the signal from the tracking sensor to the controller.

Instead of arranging transmission system 60 to connect sensor device 8 to control circuit 66, cordless radio transmitter 90 may be, as shown in FIG. 4, connected to sensor device 8, and be arranged on parabolic mirror 1. Receiver 92 is connected to control circuit 66. Transmitter 90 emits radio signals indicating the sun's azimuth and altitude. The radio signals are received by receiver 90 and cause control circuit 66 to operate motors 5 and 50 (FIG. 1) to keep parabolic mirror 1 always facing the sun.

Figure 5:
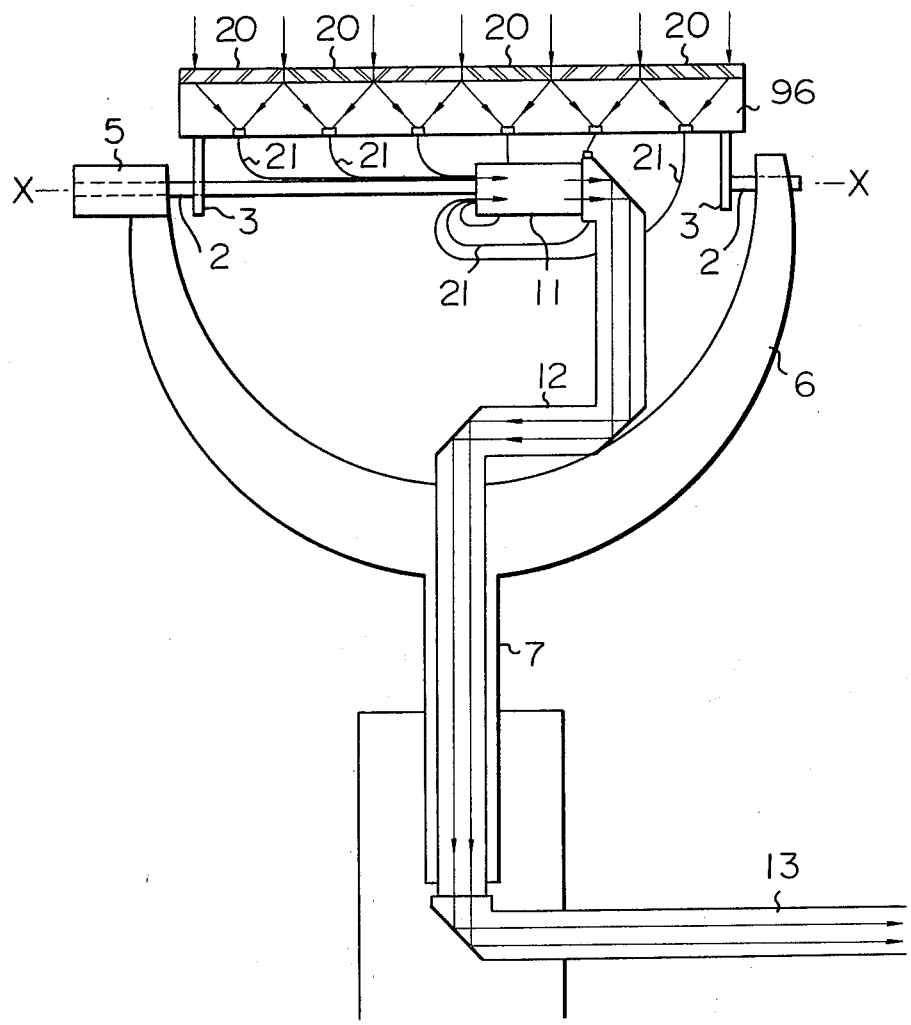
FIGS. 5 and 6 show other embodiment of the present invention.

In another embodiment, shown in FIG. 5, in place of the single parabolic mirror 1 of FIG. 1, a plurality of lenses 20 is used mounted on common support 96 by arms 3. At the focus of the each of lenses 20, an inlet of optical conductor rods 21 is arranged. The other end of each of optical conductor rods 21 is connected to first optical conductor rod 11, which is, as in FIG. 1, connected to pin 2 so as to rotate about horizontal axis X—X. Other constructions are substantially the same as those in FIG. 1. Transmission system 60, as described in FIG. 1, is also provided, though not shown in FIG. 5.

Figure 6:
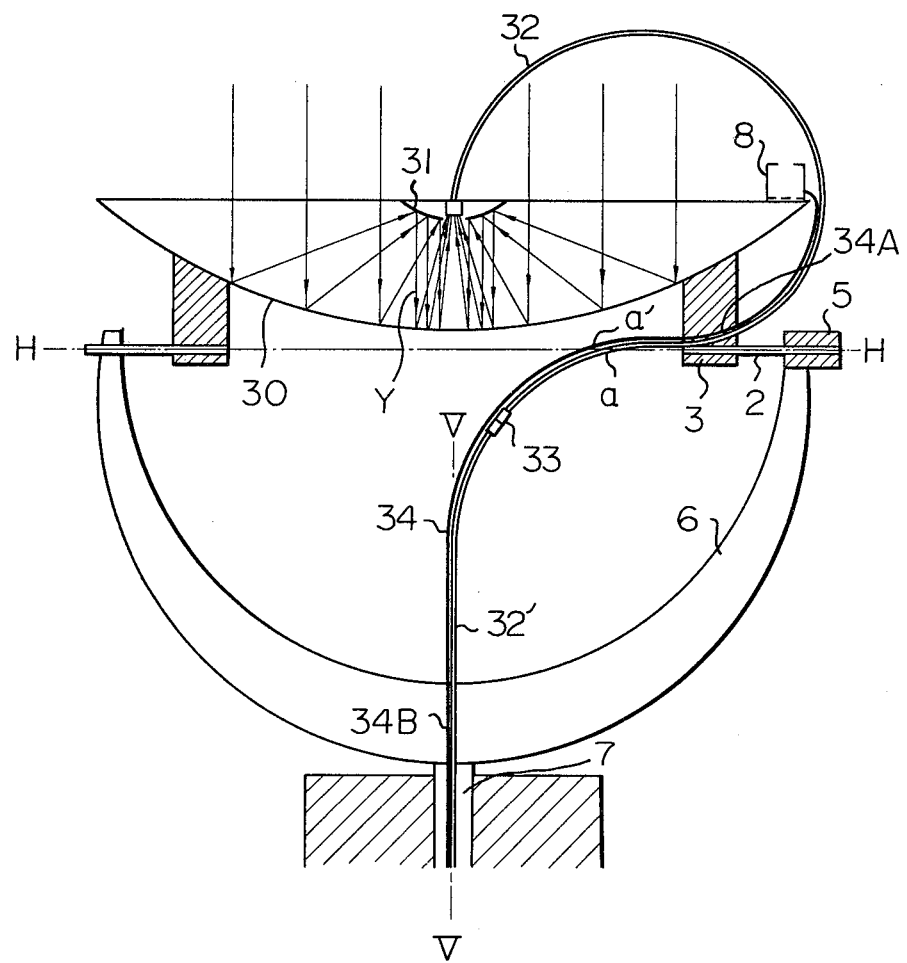

In the embodiment shown in FIG. 6, sunlight reflected by first mirror 30 is reflected by second mirror 31 to form parallel beam Y. Parallel beam Y is again reflected by first mirror 30 and is received by optical conductor cable 32. Optical conductor cable 32 has portion a located on axis H—H of pins 2. Optical conductor cable 32 has a second end connected to second optical conductor cable 32' by coupling 33. Coupling 33 allow relative rotation between cables 32 and 32', preventing the cables from winding or being subject to torsion.

In this embodiment, electric signals from the sensor device 8 are led via electric line 34 to a control circuit (not shown in FIG. 6, but similar to 66 in FIG. 1). Electric line 34 has portion 34A passed freely through arm 3 and portion a' located on first axis of rotation H—H which extends horizontally. Electric line 34 also has portion 34C passed freely through shaft 7. When the mirror 30 is rotated about first axis of rotation H—H, electric line 34 tends to be twisted. However, this twist is substantially diminished due to the fact that electric line 34 has long portion 34B freely and coaxially passed through shaft 7 and that both ends of electric line 34 are supported relatively freely. The twist of electric line 34 due to the rotation of shaft 7 about second axis V—V of rotation is also substantially diminished due to the same reason as described with reference to the first axis of rotation. Electric line 34 is arranged together with optical conductor cables 32 and 32'. However, the line 34 and cables are arranged separately with each other.

While embodiments of the present invention have been described with reference to the attached drawings, many modifications and changes may be made by those skilled in the art without departing from the scope of the invention.

I claim:

1. A sunlight collecting and concentrating apparatus, comprising: a collector means for collecting and concentrating the sunlight; a first support means for rotatably supporting the collector means about a first axis of rotation; a second support means for rotatably supporting the first support means about a second axis of rotation perpendicular to the first axis, one of said first and second axis being horizontal and the other being vertical; detecting means movable with the collector means for detecting the sun's azimuth and altitude; drive means for generating independent movement of the collector means about the first and the second axis of rotation; transmission means for transmitting signals from the detecting means to the drive means so that the collector means follows the daily and hourly changes in the sun's azimuth and altitude to keep the collector means always facing the sun; first optical conductor means for transmitting light arranged to move together with the collector means; second optical conductor means for transmitting light to a predetermined area outside of the apparatus, said second optical conductor means being arranged to move together with the first support means; and coupling means arranged between the first and second optical conductor means for transmitting the light from the former to the latter while permitting relative rotation therebetween.

2. An apparatus according to claim 1, wherein said collector means comprises a single parabolic mirror for generating a concentrated beam directed to the first optical conductor means.

3. An apparatus according to claim 2, further comprising a second parabolic mirror arranged for catching the beam received by the first mirror and for directing the beam to the first optical conductor means.

4. An apparatus according to claim 1, wherein said collector means comprises a plurality of lenses and a plurality of supplemental optical conductors each arranged to receive light from each lens on one end and each connected to the first optical conductor means on the other end.

5. An apparatus according to claim 1, wherein said coupling means is located coaxially with respect to the first axis of rotation.

6. An apparatus according to claim 1, wherein said first optical conductor means comprises an optical conductor member arranged coaxially with respect to the first axis, said optical conductor member having an inlet end opened outwardly for receiving the collected light from the collector means and a second end rotatably connected to the coupling means.

7. An apparatus according to claim 1, wherein said second conductor means comprises an optical conductor member having an end rotatably connected to the coupling means, a middle portion arranged concentrically with the second axis, and a second end connectible to the area where the collected sunlight is used.

8. An apparatus according to claim 7, further comprising another optical conductor member fixed to the second support means, a second coupling means for rotatable connection of the second conductor means with the other optical conductor member, said other optical conductor means being connected to the outside of the apparatus.

9. An apparatus according to claim 1, said first optical conductor means comprising a flexible optical cable having an inlet end located to receive the light from the collector, said flexible optical cable having a middle portion located on a first axis of rotation, said second optical conductor means comprising a flexible optical cable substantially coaxial with respect to the second axis of rotation, said coupling means being located at a position spaced from the first and second axis of rotation.

10. An apparatus according to claim 1, wherein said transmission means comprises a radio means connected to the sensor for providing signals indicating the sun's azimuth and altitude and a radio receive means connected to the drive means for driving the collector in accordance with the sun's position, said receiver being arranged on a desired position remote from the collector.

11. An apparatus according to claim 1, wherein said transmission means comprises a first transducer connected to the sensor for converting the electric signals from the sensor to photo signals, an optical signal cable connected to the first transducer, a second transducer means for converting the optical signals from the optical signal cable to electric signals, and an electric line connecting the second transducer means to the drive means.

12. An apparatus according to claim 11, wherein said first transducer means comprises luminescent semiconductor diodes and a modulator for converting signals from the diodes to digital signals by pulsatively modulating the signals from the transducer.

13. An apparatus according to claim 11, wherein said second transducer means comprises a plurality of circumferentially located photocells fixedly connected to the second support means and arranged to open to the end of the optical signal cable remote from the sensor, each of photocells being connected to the drive means.

14. An apparatus according to claim 11, wherein said second transducer means comprises an optical conductor of substantially tubular shape fixedly connected to the second support means, having an inlet with a substantially circular surface opened to the end of the optical signal cable remote from the sensor and a converged and a photosensor facing the converged end for receiving photo signal, and an electric line connecting the photo sensor with the drive means.

15. An apparatus according to claim 1, wherein said transmission means comprises an electric line connecting the sensor with the drive means, said electric line having a portion arranged along the first axis and a second portion passed freely through the second support concentrically along said second axis.

16. An apparatus according to claim 1, said drive means comprising a first electric motor means for generating the rotation about the first axis, a second electric motor means for generating the rotation about the second axis, and a control circuit connecting the transmission means with the first and second electric motor means.

* * * * *